United States Patent [19]

Mulligan

[11] Patent Number: 4,891,085
[45] Date of Patent: Jan. 2, 1990

[54] METHOD OF MAKING AN AUTOMOBILE ROOF CAP

[75] Inventor: David C. Mulligan, Blissfield, Mich.
[73] Assignee: Roto Plastics, Inc., Adrian, Mich.
[21] Appl. No.: 266,843
[22] Filed: Nov. 4, 1988
[51] Int. Cl.[4] .............................................. B32B 3/04
[52] U.S. Cl. ................................... 156/216; 156/221; 156/224; 156/267; 156/268; 296/210; 296/211; 428/218; 428/316.6
[58] Field of Search ............... 156/216, 221, 224, 267, 156/268; 296/210, 211; 428/218, 316.6

[56] References Cited

U.S. PATENT DOCUMENTS

| | | | |
|---|---|---|---|
| 3,966,526 | 6/1976 | Doerfling | 156/224 |
| 4,243,456 | 1/1981 | Cesano | 156/267 X |
| 4,247,350 | 1/1981 | McIntyre et al. | 156/216 |
| 4,263,356 | 4/1981 | Nomura et al. | 296/211 X |
| 4,338,148 | 7/1982 | Adell | 156/216 |

Primary Examiner—Robert A. Dawson
Assistant Examiner—James J. Engel, Jr.
Attorney, Agent, or Firm—Harness, Dickey & Pierce

[57] ABSTRACT

A method of manufacturing a decorative automobile roof cap by forming a flat composite of a thermoplastic cover member laminated to a core layer foam sheet, thermoforming the composite to the desired shape and forming the edges of the roof cap by removing a portion of the core layer from the cover member and then wrapping the excess cover member around the edges of the core layer and securing it to the underside of the core layer to form an edge covered with the cover member.

2 Claims, 2 Drawing Sheets

METHOD OF MAKING AN AUTOMOBILE ROOF CAP

BACKGROUND AND SUMMARY OF THE INVENTION

This invention relates to a padded roof cap for an automobile vehicle roof and more particularly to a method of manufacturing the same.

Several automotive vehicles are produced which have a decorative roof cap over the metal roof. These roof caps are often referred to as "landau tops" which cover the entire roof or only the rear portion of the vehicle roof. Typically the roof caps have vinyl or fabric outer covers with a padding material under the cover.

The typical method of manufacturing roof caps has been to glue foam onto a rigid substrate which has been shaped to fit over the metal vehicle roof. A cover is then stretched over and glued to the outer surface of the foam. The rigid substrate is then fastened to the vehicle roof with mechanical fasteners. A trim strip is then required to cover the mechanical fasteners to provide a finished appearance around the edges of the roof cap and around window openings.

It is an object of the present invention to provide an improved method of manufacturing a roof cap which does not require a separate step of stretching of the cover member over the foam pad.

It is a further object of this invention to eliminate the need for trim strips around the edges of the roof cap and particularly around the window openings while providing a finished edge appearance.

The method of manufacturing the roof cap per the present invention includes first forming a composite material by laminating a flexible thermoplastic sheet or fabric cover member onto a core layer of thermoplastic material. The core layer may consist of a noncellular thermoplastic sheet or one or more layers of thermoplastic foam. This composite is then termoformed by applying heat and pressure to a desired shape complementary to the shape of the vehicle roof for which the roof cap is intended.

The peripheral edges of the roof cap and the edges around window openings are preferably formed by providing an excess of composite beyond the desired location of the edge. The core layer material is removed from this excess leaving a flap of the cover member extending beyond the edge. This flap of the cover member is then wrapped around the edge and secured to the core layer thereby finishing the roof cap edge.

In the case of a foam core layer, prior to removal of the excess core layer, the foam may first be pinched along the desired edge location and may be heated to fuse the foam to the cover member along the edge. The foam core layer may comprise more than one layer of foam. In one preferred embodiment, two foam layers are used, the bottom layer being a high density foam and the top layer being a low density foam. The high density foam aids in providing rigidity to the roof cap.

Further objects, features and advantages of the invention will become apparent from a consideration of the following description and the appended claims when taken in connection with the accompanying drawings.

DETAILED DESCRIPTION OF THE DRAWINGS

Figure 1:
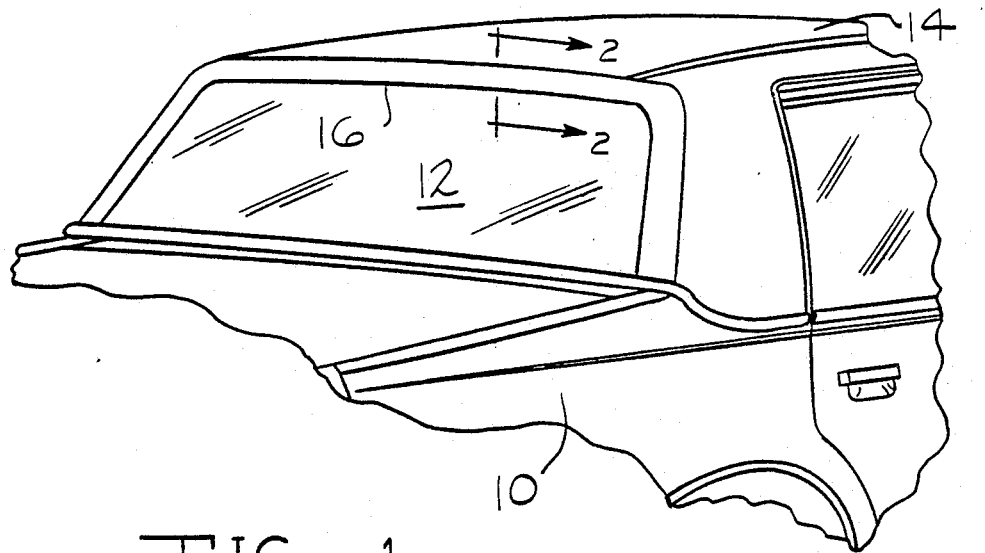
FIG. 1 is a perspective view of a rear roof portion of a motor vehicle having a roof cap of this invention.

FIG. 1 shows a portion of a motor vehicle 10 illustrating the rear section of the vehicle roof including rear window 12. The roof of the motor vehicle is equipped with a roof cap 14 manufactured according to this invention.

Figure 2:
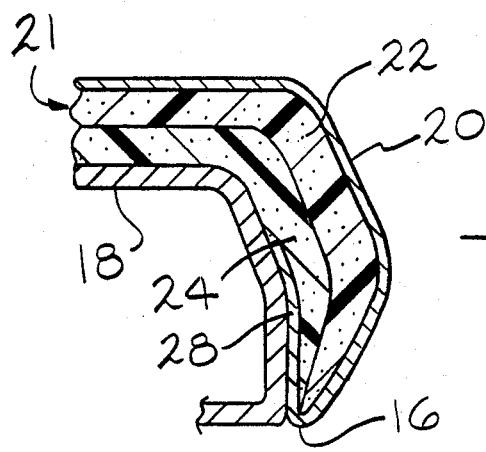
FIG. 2 is a sectional view as seen from substantially the line 2—2 of FIG. 1.

The roof cap 14 has an edge 16 which defines the window opening in the roof cap around the rear window 12. The edge 16 is shown in cross section in FIG. 2. The automobile roof includes a sheet metal layer 18 which is covered by the roof cap 14. The roof cap is of a composite structure having an outer cover member 20 of a flexible thermoplastic sheet material such as vinyl. The cover member 20 is bonded to a core layer 21 of a foam material which, in FIG. 2, comprises an outer low density foam layer 22 and an inner high density foam layer 24.

Figure 3:
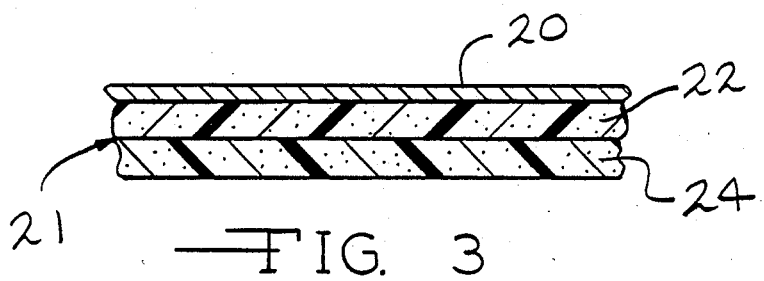
FIG. 3 is a sectional view of the composite used to form the roof cap of this invention.

The composite layer which forms the roof cap is shown in FIG. 3 prior to thermoforming the composite material into the desired shape. The low density foam 22 is first laminated to the high density foam member 24 and cover member 20. It is to be understood that the method of manufacture of the composite material is not limited to a cover member having two layers of foam material. The method of manufacture is equally suitable to composites having only one foam layer or three or more layers as may be desired and could utilize one or more layers of rigid, non-cellular thermoplastic sheet.

Figure 4:
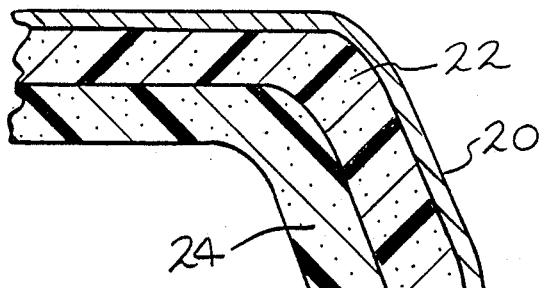
FIG. 4 is a cross sectional view of a portion of the roof cap after shaping of the composite and pinching of the foam layer at the edge location.

After forming the flat composite as shown in FIG. 3, the composite material is then thermoformed by applying head and pressure to shape the composite to the desired shape complementary to the shape of the automobile roof to which the cap is to be applied. During the thermoforming process, the foam layers along the desired edge may be heated and compressed or pinched to fuse the foam to the cover member as shown at 26 in FIG. 4, or if desired the original thickness may be retained as shown in FIG. 6.

When the composite is shaped, excess composite material 27 extends beyond the desired edge location 26. The foam layers 22 and 24 from the excess composite 27 are then removed from the cover member 20. The excess foam layers can be removed in a number of ways including mechanical means employing a router, wire wheel or other abrasive tool. The primary consideration in removing the foam layers is that the cover member 20 from which the foam is removed must not be damaged during the removal process.

Figure 6:
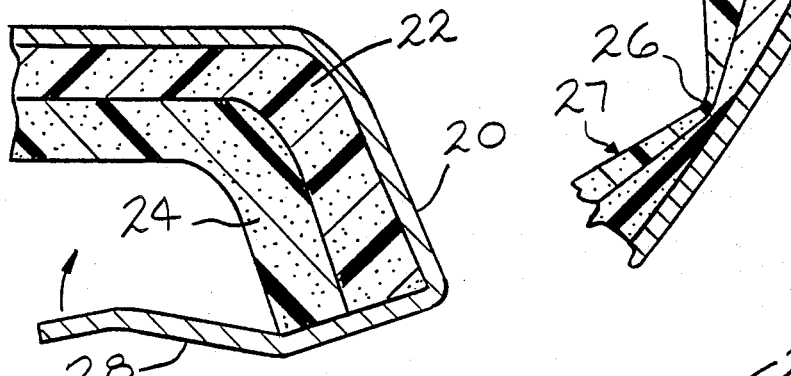
FIG. 6 is a sectional view similar to FIG. 5 without the foam(s) being compressed or pinched, but trimmed at the proposed edge and the cover member wrapped around the edge.
Figure 5:
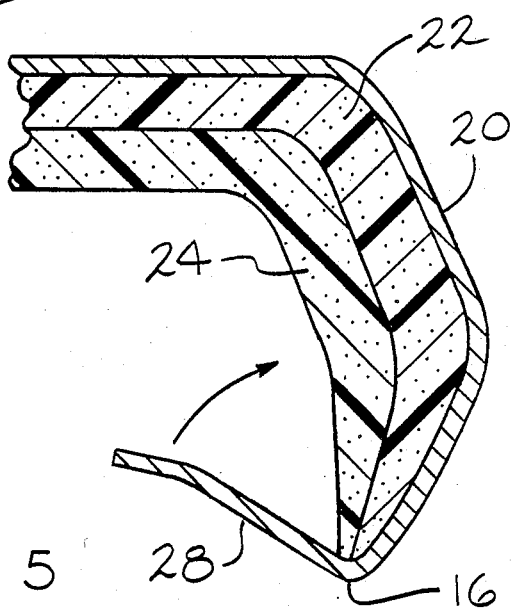
FIG. 5 is a sectional view similar to FIG. 4 in which the excess foam layer has been removed and the flap of the cover member is being wrapped around the edge.

Removal of the excess foam material 27 from the cover member results in a flap 28 of the cover member 20 along the edge 16 as shown in FIGS. 5 and 6. This flap 28 is then wrapped around the exposed edge of the core layer 21 and secured to the foam layer 24 by heat or a suitable adhesive. In so doing, a finished edge 16 is formed which defines the edge of the roof cap around the rear window 12 in the motor vehicle. This process is suitable for use in forming all edges of the roof cap 14.

This roof cap 14 may be produced in a separate distinct operation away from the vehicle assembly line and then installed on the roof of the motor vehicle 10 during vehicle assembly. The method according to the present invention simplifies the production of roof caps and requires less time to perform, thus improving the economy and efficiency of roof cap production.

It is to be understood that the invention is not limited to the exact construction or method illustrated and described above, but that various changes and modifications may be made without departing from the spirit and scope of the invention as defined in the following claims.

What is claimed is:

1. A method of manufacturing at least a portion of a cap for the roof of an automotive vehicle, said cap having a predetermined shape with at least one edge and being fastenable to a vehicle roof of complementary shape, comprising the steps of:
   a. laminating a flexible thermoplastic sheet cover member onto a core layer wherein said core layer is a sheet of thermoplastic foam having an upper layer and a lower layer of differing densities, said lower layer being of higher density than said upper layer and said cover member is laminated to said upper layer to form a composite;
   b. thermoforming said composite into said predetermined shape including pinching said foam together compressing said foam against said cover member along said edge leaving a portion of said composite adjacent said edge and heating said foam along said edge to fuse said compressed foam to said cover member;
   c. trimming a portion of said core layer adjacent said edge leaving behind a flap portion of said cover member along said edge;
   d. wrapping said flap portion around said edge so as to enclose said edge; and
   e. securing said flap portion to said core layer so as to finish said edge.

2. The method according to claim 1 wherein said step of trimming comprises removing said foam from said portion adjacent said edge to form said flap.

* * * * *